Figure 1:
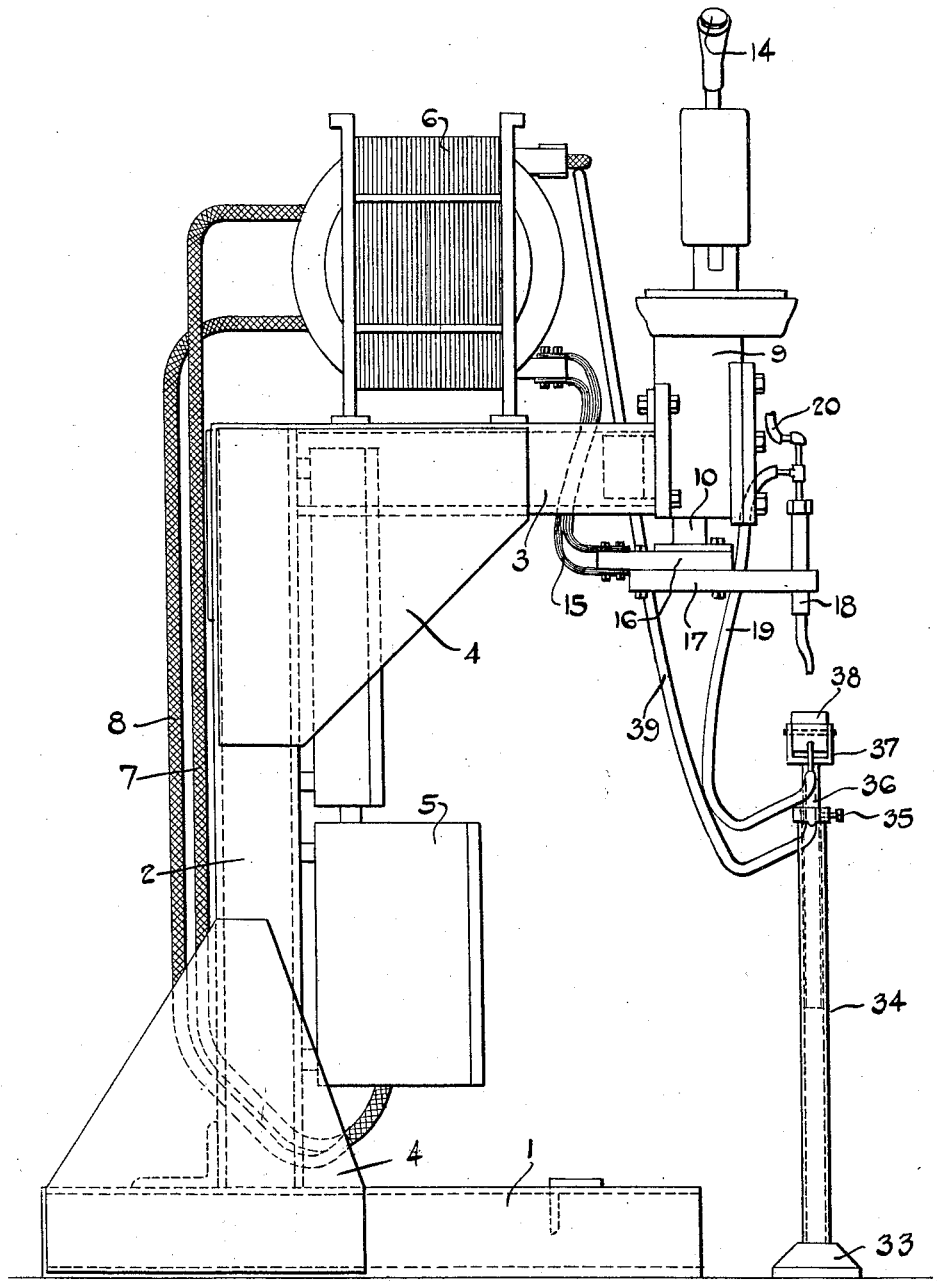

INVENTOR.
JOSEPH W. MEADOWCROFT.

Patented June 7, 1932

1,861,970

UNITED STATES PATENT OFFICE

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

METHOD OF WELDING

Application filed March 18, 1927, Serial No. 176,317. Renewed October 2, 1928.

This invention relates to a method of, and a machine for, welding. It more particularly relates to a method of, and a machine for, welding together two adjacent sheets of three or more overlapped sheets of metal such as, for example, the welding of the inturned flange of the outer panel of an automobile door to the overlap flange of the door rail. Of course, there are many other instances where it will be desirable to use the invention, besides the one just mentioned as an example.

In compliance with the Office practice, the claims in this application will be confined to the method of my invention. The machine for carrying out the method will be claimed in a divisional application, Serial No. 357,023, filed April 22, 1929.

Ordinarily when two adjacent sheets of three or more overlapped sheets of metal are welded together by spot welding a "weld" mark is made upon the outer surface of the third or other sheet. That this is the case is readily seen, as when such welding is done, it is either necessary to have one of the electrodes engage the outer surface of this exterior sheet or to provide openings through the same for passage of the electrode to the interior sheet. The welds in the first instance are found to be unsatisfactory because of the high resistance caused by the thickness of the three or more sheets of metal, and it is evident, that often the exterior sheets could not be provided with the openings suggested in the latter. Especially, is this found to be the case, where the outer panel of an automobile door is flanged around a flange of the door rail and such flanged portion of the panel is welded to the rail flange to form a door overlap. Accordingly, the practice is to use arc welding in place of the resistance welding. This practice is unsatisfactory both from the standpoint of the quality of the welds and that of quantity production. The door rails are of heavier gauge than the panels and consequently the panels respond more quickly to the heat of the arc, with the result that the deposit from the welding wire is welded to the panel instead of the panel and rail. It is clear that such welds do not stand up in use. An additional step is also necessary where arc welding is used, namely, the weld humps must be ground down and polished off.

The principal object of the invention is to provide a method of and a machine for spot welding together two adjacent sheets of three or more overlapped sheets of metal without leaving a "weld" mark upon the other sheets, or requiring the forming of openings in such sheets for the passage of an electrode.

Other objects and advantages will become apparent from time to time as the description proceeds.

The invention contemplates accomplishing its principal objective by connecting one of the two adjacent sheets of three or more overlapped sheets of metal with one side of a welding circuit independently of the other sheets, and then closing the welding circuit by a direct localized pressure contact between the other side of said circuit and the other of said adjacent sheets.

In carrying out the invention, a welding machine is used wherein one of the electrodes is in the form of a clamp adapted to be connected electrically, either directly or indirectly, with one of the adjacent sheets to be welded together, another electrode is rectilinearly movable so as to have pressure contact with the other of said adjacent sheets, and means is provided for resisting the thrust of such pressure contact of the electrode. There are, in addition, certain details of construction in the machine which are novel and which will be described at length during the course of the description.

Figure 2:
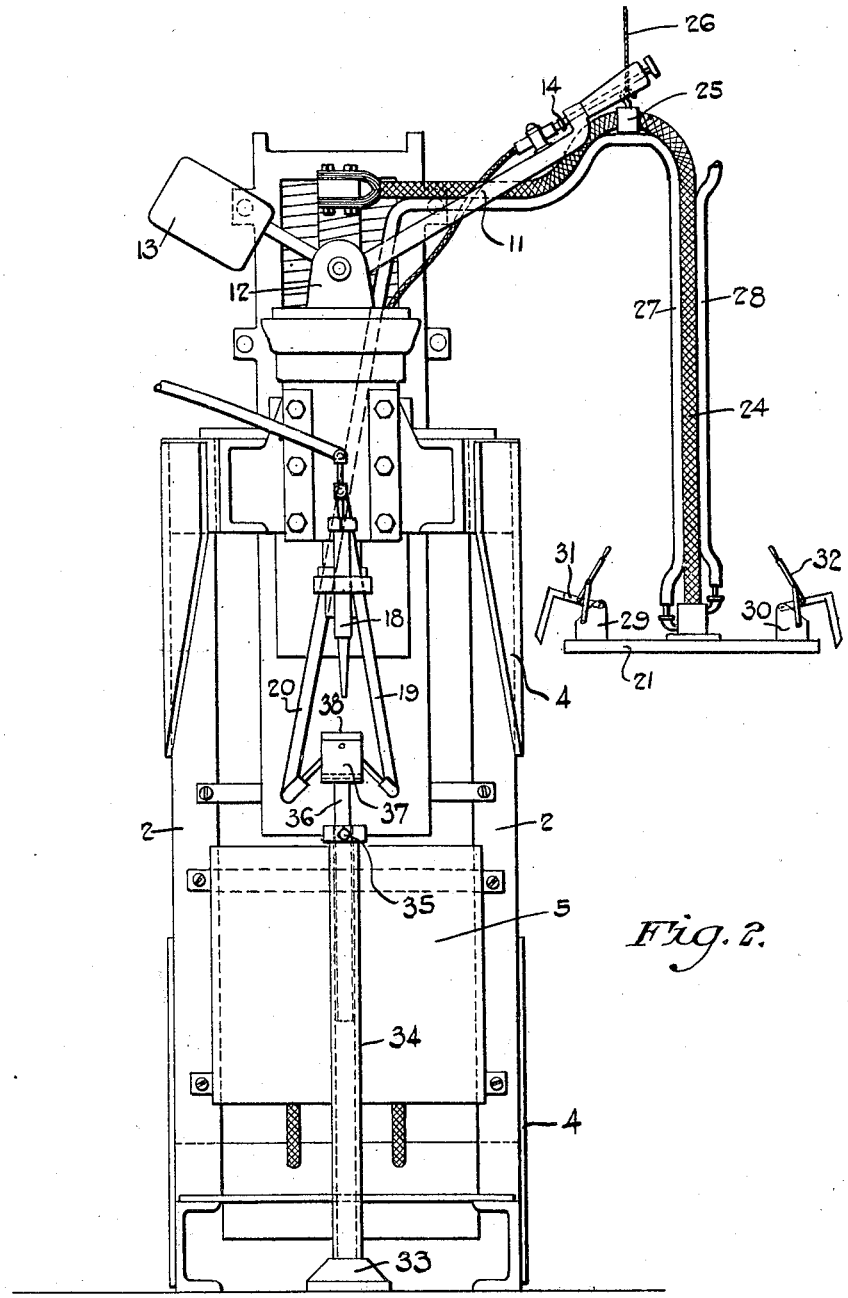
Figure 3:
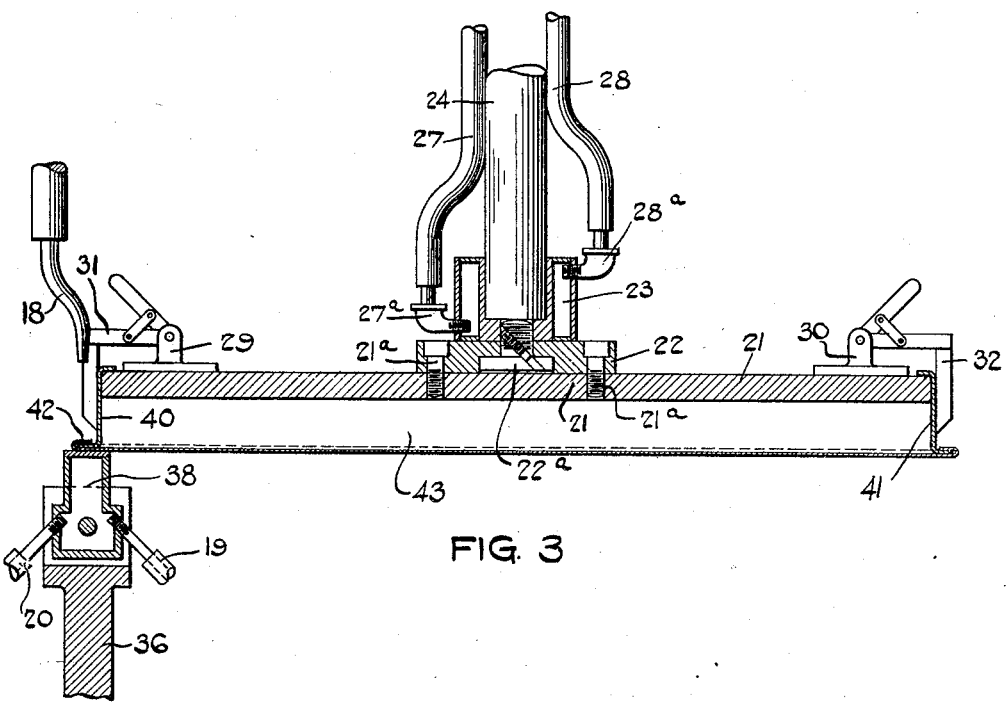
Figure 4:
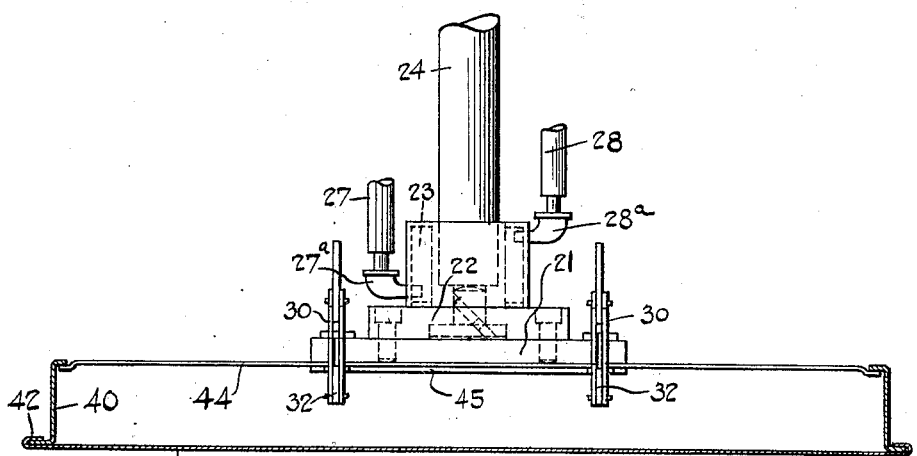

A specific description of the illustrated embodiments of the invention now follow, and should be read in connection with the accompanying drawings wherein, Fig. 1 is a side elevation of a welding machine constructed in accordance with the invention, Fig. 2 is a front elevation of the machine, Fig. 3 is a sectional view showing one of the electrodes clamped directly to the door rail of an automobile door and another electrode engaging the inturned flange of the outer panel of the door with a pressure contact to weld the same to the overlap flange of the door rail, Fig. 4 is another view showing the door rail indirectly connected to the electrode through the intermediary of the lock panel of the door.

The welding machine, illustrated in Figs. 1 and 2, is in many particulars of the conventional type. The machine comprises a base stand 1, with supporting uprights 2, and a horizontally supporting member or arm 3 arranged at the top of the machine, as is usual in most spot welding machine frames. These frame members are secured together and interbraced by means of gusset plates 4. The machine is provided with the customary switch 5 and transformer 6. However, it should be noted that the transformer is mounted in an unusual position upon the top of the frame, so that the leads of the secondary circuit may be carried as directly as possible to the electrodes of the machine. The leads 7 and 8 of the primary circuit extend in the usual manner from the switch to the transformer. The description thus far has not gone into details of construction, since the machine frame may be of any well known type, and one skilled in the art will readily understand such to be the case.

The outer end of the upper arm 3 is provided with the usual cylinder 9 through which the plunger 10, carrying the rectilinearly movable electrode is adapted to slide. The movement of the plunger is controlled by an actuating lever 11, swingably mounted in trunnions 12 and counterbalanced by the customary counterweight 13.

A push button switch 14 for controlling the primary circuit is shown connected to the handle of the lever 11, but it should be understood that the usual "Thompson switch" could be employed if desired.

The movable electrode is connected to the secondary of the transformer by the connection 15, and comprises the usual construction, being formed by the conducting bars 16 and 17. The electrode proper or die point 18 is secured in the outer end of the bar 17. The electrode 18 is connected by conduits 19 and 20 to a source of water supply whereby the same is cooled.

The other electrode, shown in Figures 1, 2 and 3, comprises a flat bar 21, of hard drawn copper or other material, which is, in turn, connected to a plate 22 having a detachable connection to a water jacket and terminal connection 23.

The plate 22 has a three point contact with the plate 21 through the fastening means 21ª and the head of the attaching member 22ª. This member 22ª extends through an opening in the plate 22 and is threaded into a tapped opening in the connection 23. A set screw or other means may be employed to lock the member in position. The water jacket and terminal connection 23 is provided with a central portion for receiving the lead of the welding circuit, while the surrounding portion constitutes a water jacket. This electrode 21 is connected by a flexible lead 24 to the secondary of the transformer 6. Connected to the lead 24 by clamp 25 is a cable 26 which is counterweighted, so as to normally hold the electrode in elevated position. The water jacket 23 is adapted to receive a circulation of water through conduits 27 and 28 connected thereto by nipples 27ª and 28ª. Clamp blocks or bases 29 and 30 are arranged upon the upper surface of the electrode 21 and pivotally support link clamps 31 and 32. Although only two clamps are shown, it should be understood that any number might be used and the form thereof may be of any suitable design, the clamps shown not having been described in detail for this reason. The electrode 21 is readily moved around, thus facilitating its application to the work, because of its flexible suspension.

The present machine will here be seen to vary considerably from the usual type, in that, the lower arm ordinarily carrying the fixed electrode is omitted.

An undersupport is provided for supporting the work so that the movable electrode can exert pressure thereon. This support comprises a base block 33, screwed or otherwise aranged upon the floor, and a vertically extending substantially tubular hollow member 34. At the upper end of the member 34 is an enlarged collar, through an opening in which a set screw 35 is adapted to operate. A rod member 36 is arranged within the tubular upright 34 and is adapted to have sliding movement therein, so that it may be adjusted in various positions. The upper end of the rod is provided with a yoke 37 in which a supporting block 38 is pivotally mounted. This block is adapted to underlie the work in substantial alignment with the movable electrode, and since the same is pivotally mounted, it may adjust itself to slight irregularities in the surface thereof. It has also been shown that the rod 36 is vertically adjustable, and also that it may be turned within the tubular member 34, thus indicating that in effect the supporting block 38 has universal movement with respect to the work. In order that a large amount of heat may be carried off from that portion of the work engaged by the supporting block, and thus maintain such portion below welding temperature, the block is preferably formed of a material having a high degree of thermal conductivity, such as copper. The cooling of this portion of the work is further effected by the provision of cooling means for the supporting block in the nature of a circulating stream of water supplied to the same by the conduits 19 and 39.

In Fig. 3 of the drawing is shown the manner in which the machine may be used to weld an inturned flange of an outer panel of an automobile door to the overlap flange of the door rail.

The electrode 21 is placed between the side rails 40 and 41 of the door and the clamps 31 and 32 are then drawn to clamp the electrode and door rails together.

The undersupporting member is then arranged beneath the overlap flange of the door and the rectilinearly movable electrode is brought into pressure contact with the inturned flange 42 of the outer panel 43. The welding circuit is thus completed, passing through the electrode 18, flange 42, door rail 40, and electrode 21. Thus the flange 42 is welded to the overlap flange of the rail without leaving a "weld" mark upon the outer surface of the outer panel.

In Fig. 4 a slightly modified form is shown, the clamp electrode in this form being adapted to be connected indirectly to the rail through the lock panel 44 of the door. The clamp electrode 21 shown in this form has a curved end 45 adapted to grip one edge of the lock panel while the clamps grip the other edge. The welding operation in this form is the same as in that previously described. The welding circuit being different, however, as it passes from electrode 18, through flange 42, rail 40, lock panel 44, and electrode 21. The lock panel is welded to the rail and it will be evident that good electrical connection is effected by the welds.

It has been found that the welds made by the methods described, are more perfect throughout the door if the secondary voltage is increased from 7.3 to 18. The increased voltage will get the current to the point of the weld without undue throwing. The ground connection will be spread out so that the current may reach the regions of the welds by the shortest possible route consistent with the simple connection. This increase in voltage is most important and has decided beneficial results, as it not only perfects each weld but also greatly increases the speed of each welding operation thereby improving production.

The modifications and adaptations of which the invention is susceptible are only limited by the scope of the appended claims.

What I claim is:—

1. A method of welding the inturned flange of the outer panel of an automobile door or the like to the overlap flange of the door rail consisting in clamping one side of the welding circuit to the door so as to be in electrical connection with the door rail, and completing said welding circuit through a localized pressure contact with the inturned flange of the outer panel, the while supporting said door at a point opposite said pressure contact by a support having high thermal conductivity.

2. A method of welding the inturned flange of the outer panel of an automobile door to the overlap flange of the door rail consisting in clamping one side of the welding circuit to the door so as to be in electrical connection with the door rail, supporting said door by means engaging the outer panel at the door overlap, and completing said welding circuit through a localized pressure contact with the inturned flange of the outer panel applied in substantial alignment with the supporting means.

3. A method of welding the inturned flange of the outer panel of an automobile door or the like to the overlap flange of the door rail consisting in clamping one side of the welding circuit to the door so as to be in electrical connection with the door rail, successively completing said welding circuit through a series of localized pressure contacts with the inturned flange of the outer panel, and maintaining the temperature of the outer panel adjacent the outer side of the overlap flange of the rail below welding temperature.

4. A method of welding two overlapped sheets of metal together consisting in connecting one of the sheets to one side of a welding circuit independently of the other sheet at a point remote from the weld point, supporting said overlapped sheets at the approximate point of the weld, and completing said circuit through a localized pressure contact within the area of the overlap, applying a voltage sufficiently high to effect welding in a time less than that required for a point opposite the pressure contact to become visibly affected by the welding heat, and conducting heat from said opposite point.

In testimony whereof he hereunto affixes his signature.

JOSEPH W. MEADOWCROFT.